(12) United States Patent
Moshe et al.

(10) Patent No.: US 11,544,205 B2
(45) Date of Patent: Jan. 3, 2023

(54) PEER STORAGE DEVICES SHARING HOST CONTROL DATA

(71) Applicant: Western Digital Technologies, Inc., San Jose, CA (US)

(72) Inventors: Eran Moshe, Kfar Saba (IL); Danny Berler, Tel-Mond (IL)

(73) Assignee: Western Digital Technologies, Inc., San Jose, CA (US)

( * ) Notice: Subject to any disclaimer, the term of this patent is extended or adjusted under 35 U.S.C. 154(b) by 45 days.

(21) Appl. No.: 17/176,492

(22) Filed: Feb. 16, 2021

(65) Prior Publication Data
US 2022/0164299 A1 May 26, 2022

Related U.S. Application Data

(60) Provisional application No. 63/116,290, filed on Nov. 20, 2020.

(51) Int. Cl.
| | |
|---|---|
| *G06F 13/16* | (2006.01) |
| *G06F 21/44* | (2013.01) |
| *G06F 12/0802* | (2016.01) |
| *G06F 9/50* | (2006.01) |

(52) U.S. Cl.
CPC ........ *G06F 13/1668* (2013.01); *G06F 9/5016* (2013.01); *G06F 12/0802* (2013.01); *G06F 21/44* (2013.01); *G06F 2212/1032* (2013.01)

(58) Field of Classification Search
CPC .............. G06F 9/5016; G06F 12/0802; G06F 13/1668; G06F 21/44; G06F 2212/1032
See application file for complete search history.

(56) References Cited

U.S. PATENT DOCUMENTS

| | | | |
|---|---|---|---|
| 7,117,211 B2 | 10/2006 | Whittingham et al. |
| 7,177,211 B2 | 2/2007 | Zimmerman |
| 7,783,777 B1 | 8/2010 | Pabla et al. |
| 8,239,597 B2 | 8/2012 | Wishneusky |

(Continued)

OTHER PUBLICATIONS

Nakamura et al., How beneficial is peer-to-peer DMA? In Proceedings of the 11th ACM SIGOPS Asia-Pacific Workshop on Systems (APSys '20). Association for Computing Machinery, New York, NY, USA, 25-32. https://doi.org/10.1145/3409963.3410491. Published online Aug. 24, 2020. (Year: 2020).*

(Continued)

*Primary Examiner* — Eric T Oberly
(74) *Attorney, Agent, or Firm* — Patent Law Works LLP

(57) ABSTRACT

Systems and methods for peer storage devices to share host control data are described. Storage devices may include a host interface configured to connect to a host system and a control bus interface to connect to a control bus. Peer storage devices may establish peer communication through the control bus interface to share host control data, such as access parameters for host resources allocated to peer storage devices. A storage device may access host resources using access parameters allocated to that device, receive peer access parameters from a peer storage device, and access host resources allocated to the peer storage device using the peer access parameters. For example, a storage device may use a peer host memory buffer to store buffer data prior to releasing the host memory buffer allocated to it.

20 Claims, 8 Drawing Sheets

(56) References Cited

U.S. PATENT DOCUMENTS

| | | | |
|---|---|---|---|
| 9,025,495 | B1 | 5/2015 | Brown et al. |
| 9,448,614 | B2 | 9/2016 | Slik |
| 10,481,990 | B2 | 11/2019 | Eder et al. |
| 10,580,512 | B2 | 3/2020 | Subramanian et al. |
| 2001/0044879 | A1 | 11/2001 | Moulton et al. |
| 2003/0163599 | A1 | 8/2003 | Hills et al. |
| 2005/0055602 | A1 | 3/2005 | Werner et al. |
| 2008/0256292 | A1 | 10/2008 | Flynn et al. |
| 2009/0030986 | A1 | 1/2009 | Bates |
| 2010/0165896 | A1 | 7/2010 | Gong et al. |
| 2012/0066439 | A1 | 3/2012 | Fillingim |
| 2019/0034306 | A1* | 1/2019 | Wysocki ............. G06F 11/2094 |
| 2019/0146709 | A1* | 5/2019 | Im .......................... G06F 3/061 |
| | | | 711/103 |
| 2020/0042380 | A1 | 2/2020 | Roberts |
| 2020/0042390 | A1 | 2/2020 | Roberts |
| 2020/0257590 | A1 | 8/2020 | Bolkhovitin et al. |
| 2020/0327018 | A1 | 10/2020 | Park et al. |
| 2021/0149757 | A1 | 5/2021 | Ozturk et al. |

OTHER PUBLICATIONS

International Search Report and Written Opinion for International Application No. PCT/US2021/031955, dated Jul. 28, 2021, 21 pgs.
International Search Report and Written Opinion for International Application No. PCT/US2021/031962, dated Aug. 4, 2021, 9 pgs.
Jones, M., Digital Power Management, Analog Devices, https://www.analog.com/ru/technical-articles/digital-power-management.html, Retrieved Aug. 10, 2020 (8 pages).

* cited by examiner

PEER STORAGE DEVICES SHARING HOST CONTROL DATA

TECHNICAL FIELD

The present disclosure generally relates to computing system devices interconnected through a low-bandwidth bus and, more particularly, to peer device communication through a low-bandwidth control bus without host system intervention.

BACKGROUND

Some computing systems, such as storage arrays, may include multiple storage devices supporting one or more host systems through a peripheral or storage interface bus, such as peripheral component interconnect express (PCIe), serial advanced technology attachment (SATA), or serial attached [small computer serial interface (SCSI)] (SAS). These interfaces may be configured for high-bandwidth transfer rates, such as 3 gigabits (Gb)/second (s), 6 Gb/s, 8 Gb/s, 12 Gb/s, 16 Gb/s, etc., to enable fast and reliable data transfer to and from storage devices, with some versions supporting as high as 512 Gb/s.

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

Each storage device in a multi-device storage system may be connected to a host system through at least one high-bandwidth interface, such as PCIe, using an appropriate storage protocol for the storage device, such as non-volatile memory express (NVMe) for accessing solid state drives (SSDs) or the storage blades of all flash arrays. Some multi-device storage systems employ storage devices capable of communicating with one another and/or host systems over the interconnecting fabric and/or network fabric through the high-bandwidth interface. Such fabric-based distributed storage systems may include storage devices configured with direct memory access to enable more efficient transfer of data to and from hosts and other systems.

In some configurations, each storage device may also include another interface that is configured for power management and/or low-bandwidth communication with computing devices sharing the same utility or control bus. For example, storage devices may include a control bus interface that complies with inter-integrated circuit (I2C), improved inter-integrated circuit (I3C), system management bus (SMBus), or similar low-bandwidth control bus protocols. These command buses may interconnect the storage devices within a multi-device storage system and provide a synchronous, multi-master, packet switched, serial communication bus. In some computing systems, control bus pins may be included as part of the physical peripheral interface connector. So, for example, a PCIe physical interface connector may include a set of I2C, I3C, or SMBus pins at one end of the connector for providing the low-bandwidth control interface. For comparison to the high-bandwidth peripheral interfaces used for data transfer, these low-bandwidth control bus interfaces may support ~3-30 megabits (Mb)/s and may operate as low as 100 kilobits (kb)/s.

In some systems, the low-bandwidth control bus may be initialized for communication early in the boot cycle of the storage devices to assist with power management, discovery, and access to external resources, such as temperature sensors, fan controllers, light emitting diode (LED) indicators, etc. Storage devices may have access to the control bus before host communication or control is established through the high-bandwidth peripheral bus.

In some multi-device storage systems, storage devices may encounter errors in accessing their allocated host memory buffers, have to release their allocated host memory buffers when they enter a low power mode, or otherwise interrupt access to allocated host resources. As a result, buffer data stored in the host memory buffer may be lost and/or the storage device may need to re-initialize the host memory buffer.

Backing up buffer data to a host memory buffer allocated to a peer storage device and/or accessing other host resources allocated to a peer storage device without relying on the host system may be advantageous. A reliable way of accessing host resources allocated to peer storage devices to enable host resource redundancy for peer storage devices without relying on the host to manage such redundancy and access privileges may be needed.

SUMMARY

Various aspects for peer storage device sharing of host control data, particularly messaging among peer storage devices over a low-bandwidth control bus to share access parameters for host resources, such as host memory buffers, are described.

One general aspect includes a system that includes a first storage device including: a storage interface configured to connect to a host system; a storage medium configured to store host data; and a host access service. The host access service may be configured to: access, using a first set of access parameters of the first storage device, a first host resource allocated to the first storage device; receive a second set of access parameters from a second storage device among a plurality of peer storage devices; and access, using the second set of access parameters of the second storage device, a second host resource allocated to the second storage device.

Implementations may include one or more of the following features. The first storage device may further include a control bus interface configured to connect to a control bus, where the plurality of peer storage devices are configured to connect to the control bus, and a peer messaging service configured to: establish peer communication with the plurality of peer storage devices over the control bus; receive, through the control bus interface, the second set of access parameters from the second storage device; and pass the second set of access parameters to the host access service. The peer messaging service may be further configured to: select the second storage device from the plurality of peer storage devices; and send, to the second storage device and through the control bus interface, a peer message requesting the second set of access parameters. The host access service may be further configured to: receive, from each storage device of the plurality of peer storage devices, corresponding sets of access parameters; and store the corresponding sets of access parameters in a peer device registry. The peer device registry may include a peer device entry corresponding to each storage device of the plurality of peer storage devices. Each peer device entry may include: a peer device identifier; the corresponding set of access parameters; and a host resource description for a host resource configured for access with the corresponding set of access parameters. The system may include the host system including: a host processor, a host storage interface configured to communicate with the first storage device and the plurality of peer storage devices, and a host memory. The host memory may include a plurality of host memory buffers. The host system may be configured to allocate each host memory buffer of the plurality of host memory buffers to a corresponding storage device selected from the first storage device and the plurality of peer storage devices. The first host resource may include a first host memory buffer allocated to the first storage device and the second host resource may include a second host memory buffer allocated to the second storage device. The host system may be further configured to: determine the first set of access parameters for the first storage device; provide the first set of access parameters to the first storage devices; authenticate the first set of access parameters for storage device access to the first host resource; determine the second set of access parameters for the second storage device; provide the second set of access parameters to the second storage device; and authenticate the second set of access parameters for storage device access to the second host resource. The first storage device further may include a buffer redundancy service configured to replicate, using the first set of access parameters and the second set of access parameters, buffer data from the first host memory buffer to the second host memory buffer. The buffer redundancy service may be further configured to recover, using the first set of access parameters and the second set of access parameters, buffer data from the second host memory buffer to the first host memory buffer. The buffer redundancy service may be further configured to: monitor the first storage device for a first change in power mode operation; initiate, responsive to the first change in power mode operation, the replication of the buffer data from the first host memory buffer to the second host memory buffer; release, responsive to replicating the buffer data, the first host buffer memory allocated to the first storage device; monitor the first storage device for a second change in power mode operation; and initiate, responsive to the second change in power mode operation, recovery of the buffer data from the second host memory buffer to the first host memory buffer.

Another general aspect includes a computer-implemented method including: accessing, from a first storage device and using a first set of access parameters, a first host resource allocated to the first storage device; receiving, to the first storage device, a second set of access parameters from a second storage device among a plurality of peer storage devices; and accessing, from the first storage device and using the second set of access parameters, a second host resource allocated to the second storage device.

Implementations may include one or more of the following features. The computer-implemented method may include establishing, from the first storage device and over a control bus, peer communication with the plurality of peer storage devices, where: the first storage device and each storage device of the plurality of peer devices include a host interface configured to connect to a host system and a control bus interface configured to connect to the control bus; and receiving the second set of access parameters is over the control bus. The computer-implemented method may include: determining, by the first storage device, the second storage device from the plurality of peer storage devices; and sending, from the first storage device to the second storage device and over the control bus, a peer message requesting the second set of access parameters. The computer-implemented method may include: receiving, to the first storage device and from each storage device of the plurality of peer storage devices, corresponding sets of access parameters; and storing, by the first storage device, the corresponding sets of access parameters in a peer device registry. Storing the corresponding sets of access parameters in the peer device registry may include storing a peer device entry corresponding to each storage device of the plurality of peer storage devices, and each peer device entry may include: a peer device identifier; the corresponding set of access parameters; and a host resource description for a host resource configured for access with the corresponding set of access parameters. The computer-implemented method may include allocating each host memory buffer of a plurality of host memory buffers to a corresponding storage device selected from the first storage device and the plurality of peer storage devices. The first host resource may include a first host memory buffer allocated to the first storage device and the second host resource may include a second host memory buffer allocated to the second storage device. The computer-implemented method may include: determining the first set of access parameters for the first storage device; authenticating, by a host system including the plurality of host memory buffers, the first set of access parameters for storage device access to the first host resource; determining the second set of access parameters for the second storage device; and authenticating, by the host system, the second set of access parameters for storage device access to the second host resource. The computer-implemented method may include: replicating, by the first storage device using the first set of access parameters and the second set of access parameters, buffer data from the first host memory buffer to the second host memory buffer; and recovering, by the first storage device using the first set of access parameters and the second set of access parameters, buffer data from the second host memory buffer to the first host memory buffer. The computer-implemented method may include: monitoring the first storage device for a first change in power mode operation; initiating, responsive to the first change in power mode operation, the replication of the buffer data from the first host memory buffer to the second host memory buffer; releasing, responsive to replicating the buffer data, the first host buffer memory allocated to the first storage device; monitoring the first storage device for a second change in power mode operation; and initiating, responsive to the second change in power mode operation, recovery of the buffer data from the second host memory buffer to the first host memory buffer.

Still another general aspect includes a storage system including a plurality of storage devices, where each storage device may include: a storage interface configured to connect to a host system; a control bus interface configured to connect to a control bus; a storage medium configured to store host data; means for accessing, using an allocated set of access parameters of that storage device, an allocated host resource allocated to that storage device; means for receiving, over the control bus, a peer set of access parameters from a peer storage device among the plurality of storage devices; and means for accessing, using the peer set of access parameters of the peer storage device, a peer host resource allocated to the peer storage device.

The various embodiments advantageously apply the teachings of storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve shared access to host resources by peer storage devices, such as by using peer messaging over a control bus among storage devices to share access parameters. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
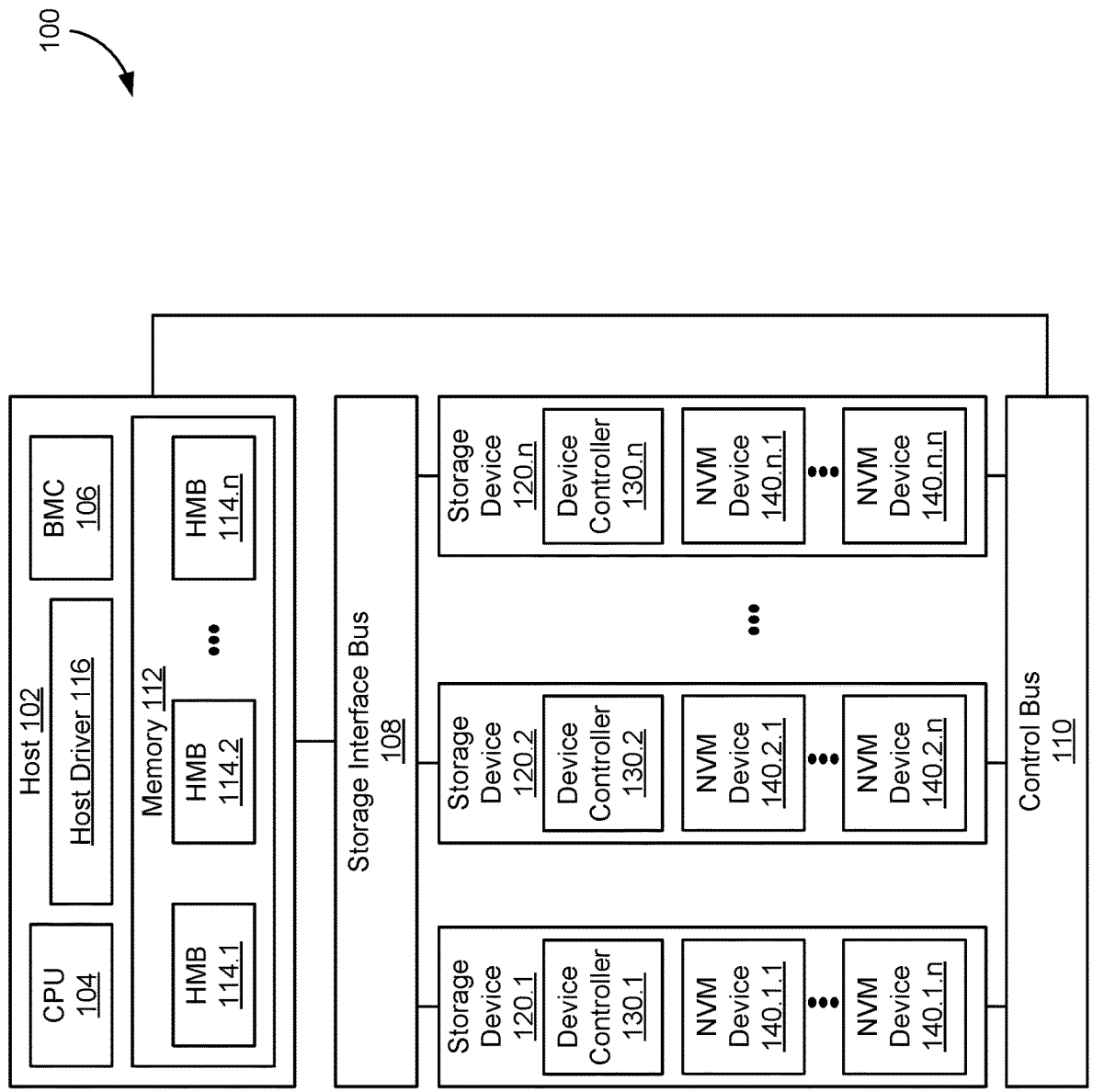
FIG. 1 schematically illustrates a multi-device storage system with a storage interface bus and a control bus.

FIG. 1 shows an embodiment of an example data storage system 100 with multiple data storage devices 120 interconnected by both storage interface bus 108 and control bus 110. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, disk drives, or drives). In some embodiments, storage devices 120 may be configured in a server or storage array blade or similar storage unit for use in data center storage racks or chassis. Storage devices 120 may interface with one or more hosts 102 and provide data storage and retrieval capabilities for or through those host systems. In some embodiments, storage devices 120 may be configured in a storage hierarchy that includes storage nodes, storage controllers, and/or other intermediate components between storage devices 120 and host 102. For example, each storage controller may be responsible for a corresponding set of storage nodes and their respective storage devices connected through a corresponding backplane network, though only storage devices 120 and host 102 are shown.

In the embodiment shown, a number of storage devices 120 are attached to a common storage interface bus 108 for host communication. For example, storage devices 120 may include a number of drives arranged in a storage array, such as storage devices sharing a common rack, unit, or blade in a data center or the SSDs in an all flash array. In some embodiments, storage devices 120 may share a backplane network, network switch(es), and/or other hardware and software components accessed through storage interface bus 108 and/or control bus 110. For example, storage devices 120 may connect to storage interface bus 108 and/or control bus 110 through a plurality of physical port connections that define physical, transport, and other logical channels for establishing communication with the different components and subcomponents for establishing a communication channel to host 102. In some embodiments, storage interface bus 108 may provide the primary host interface for storage device management and host data transfer, and control interface bus 110 may include limited connectivity to the host for low-level control functions.

In some embodiments, storage devices 120 may be referred to as a peer group or peer storage devices because they are interconnected through storage interface bus 108 and/or control bus 110. In some embodiments, storage devices 120 may be configured for peer communication among storage devices 120 through storage interface bus 108, with or without the assistance of host 102. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108.

In some embodiments, storage devices 120 may be configured for peer communication using multi-master discovery and messaging compliant with a low-bandwidth interface standard. For example, storage devices 120 may be configured for packet-based messaging through control bus 110 using a low-bandwidth bus protocol, such as inter-integrated circuit (I2C), improved inter-integrated circuit (I3C), system management bus (SMBus), etc. Storage devices 120 may be interconnected by a common control bus to provide a low-bandwidth communication channel with host 102 and other system components to assist with power management, discovery, and access to external resources, such as temperature sensors, fan controllers, light emitting diode (LED) indicators, etc. For example, control bus 110 may connect storage devices 120 to a baseboard management controller (BMC) for monitoring the physical state of storage devices 120 for host 102. Storage devices 120 may be defined as peer storage devices based on their connection to a shared control bus 110.

In some embodiments, data storage devices 120 are, or include, solid-state drives (SSDs). Each data storage device 120.1-120.$n$ may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, host or host system 102 may be coupled to data storage system 100 through a network interface that is part of host fabric network that includes storage interface bus 108 as a host fabric interface. In some embodiments, multiple host systems 102 (only one of which is shown in FIG. 1) are coupled to data storage system 100 through the fabric network, which may include a storage network interface or other interface capable of supporting communications with multiple host systems 102. The fabric network may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks.

Host system 102, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host system 102 is sometimes called a host, client, or client system. In some embodiments, host system 102 is a server system, such as a server system in a data center, or a storage system, such as a storage array in a data center. In some embodiments, the one or more host systems 102 are one or more host devices distinct from a storage controller or storage node housing the plurality of storage devices 120. The one or more host systems 102 may be configured to store and access data in the plurality of storage devices 120.

Host system 102 may include one or more central processing units (CPUs) 104 for executing compute operations or instructions for accessing storage devices 120 through storage interface bus 108. In some embodiments, CPU 104 may include a processor and be associated with operating memory (not shown) for executing both storage operations and a storage interface protocol compatible with storage interface bus 108 and storage devices 120. In some embodiments, a separate storage interface unit (not shown) may provide the storage interface protocol and related processor and memory resources. From the perspective of storage devices 120, storage interface bus 108 may be referred to as a host interface bus and provides a host data path between storage devices 120 and host 102.

Host system 102 may include a BMC 106 configured to monitor the physical state of host 102, storage devices 120, and/or other components of data storage system 100. In some embodiments, BMC 106 may include processor, memory, sensor, and other resources integrated in BMC 106 and/or accessible over control bus 110. BMC 106 may be configured to measure internal variables within a housing, adjacent components, and/or from the components themselves within host 102 or data storage system 100, such as temperature, humidity, power-supply voltage, fan speeds, communication parameters, and/or operating system (OS) functions. BMC 106 may enable systems and components to be power cycled or rebooted as needed through control signals over control bus 110. In some embodiments, BMC 106 may be configured to receive status communication from storage devices 120 through control bus 110 during boot cycles, prior to initialization of host communication through storage interface bus 108.

Host system 102 may include a memory 112 configured to support a plurality of host memory buffers 114 allocated to storage devices 120. For example, memory 112 may include one or more dynamic random access memory (DRAM) devices for use by storage devices 120 for command, management parameter, and/or host data storage and transfer. In some embodiments, storage devices 120 may be configured for direct memory access (DMA), such as using remote direct memory access (RDMA) protocols, over storage interface bus 108 to access and use the host memory buffer 114 allocated to that storage device. In some embodiments, host memory buffers 114 may be allocated to each storage device 120 such that each storage device receives a dedicated set of memory locations with known addresses. In some embodiments, host memory buffers 114 may be dynamically allocated as each storage device 120 is initialized and/or the memory size allocated to that storage device may fluctuate within an acceptable set of buffer size limits. In some embodiments, storage devices 120 may use the host memory buffer for caching host data mapping information, such as recent or heavily used LBAs and/or corresponding FTL data. This buffer data may be lost when a storage device power cycles, enters a low power mode, or experiences a storage interface or host error. Host or interface errors may occur when storage devices 120 try to reach data stored in their allocated host memory buffer. For example, errors may result when establishing the connection to host memory buffers 114 where bit flips in the host memory location prevent the data from being read. Without redundancy, this host memory buffer data may be lost.

Host system 102 may include a host driver 116 configured to manage storage device access to host memory buffers 114 and/or other host system resources. For example, host system 102 may include memory resources (e.g., host buffer memory), processor resources (e.g., CPU core), and/or specialized resources (e.g., error correction coded engines, computational accelerators, etc.) that are configured for access by storage devices over storage interface bus 108 using an access protocol and a unique set of access parameters allocated to that storage device. Host driver 116 may be configured to manage the discovery, allocation, authentication, and use of host resources by storage devices 120. For example, host driver 116 may comply with NVMe and/or RDMA standards for enabling storage device access to host memory buffers 114. Host driver 116 may allocate a set of host buffer memory locations to each storage device and maintain a memory allocation table or similar data structure for identifying which memory locations are allocated to which storage device.

In some embodiments, a set of access parameters may be used by each storage device for accessing their corresponding host memory buffer 114. For example, host memory buffer 114.1 may include memory locations 1-100 allocated to storage device 120.1, host memory buffer 114.2 may include memory locations 101-200 allocated to storage device 120.2, etc. and those storage locations may be associated with a unique storage device identifier. Additional access parameters may include additional authentication values, encryption-related key values, error correction values, and/or interface syntax parameters that determine how the host resource behaves, such as flags, extensions, or other parameter values that enable or disable host resource features. Host driver 116 may authenticate messages, sessions, or access attempts received through storage interface bus 108 to determine whether valid access parameters corresponding to the allocated storage device for the target host resource, such as host memory buffer 114.1, are included in the access attempt. For example, host driver 116 may parse one or more access parameters from the received message and compare those parameters, such as storage device identifier, to the parameters host driver 116 has stored for the allocated resource. Access attempts to host memory buffer 114.1 may include the storage device identifier for storage device 120.1, to which that storage buffer has been allocated, in order to be authenticated by host driver 116 and granted access to host memory buffer 114.1.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
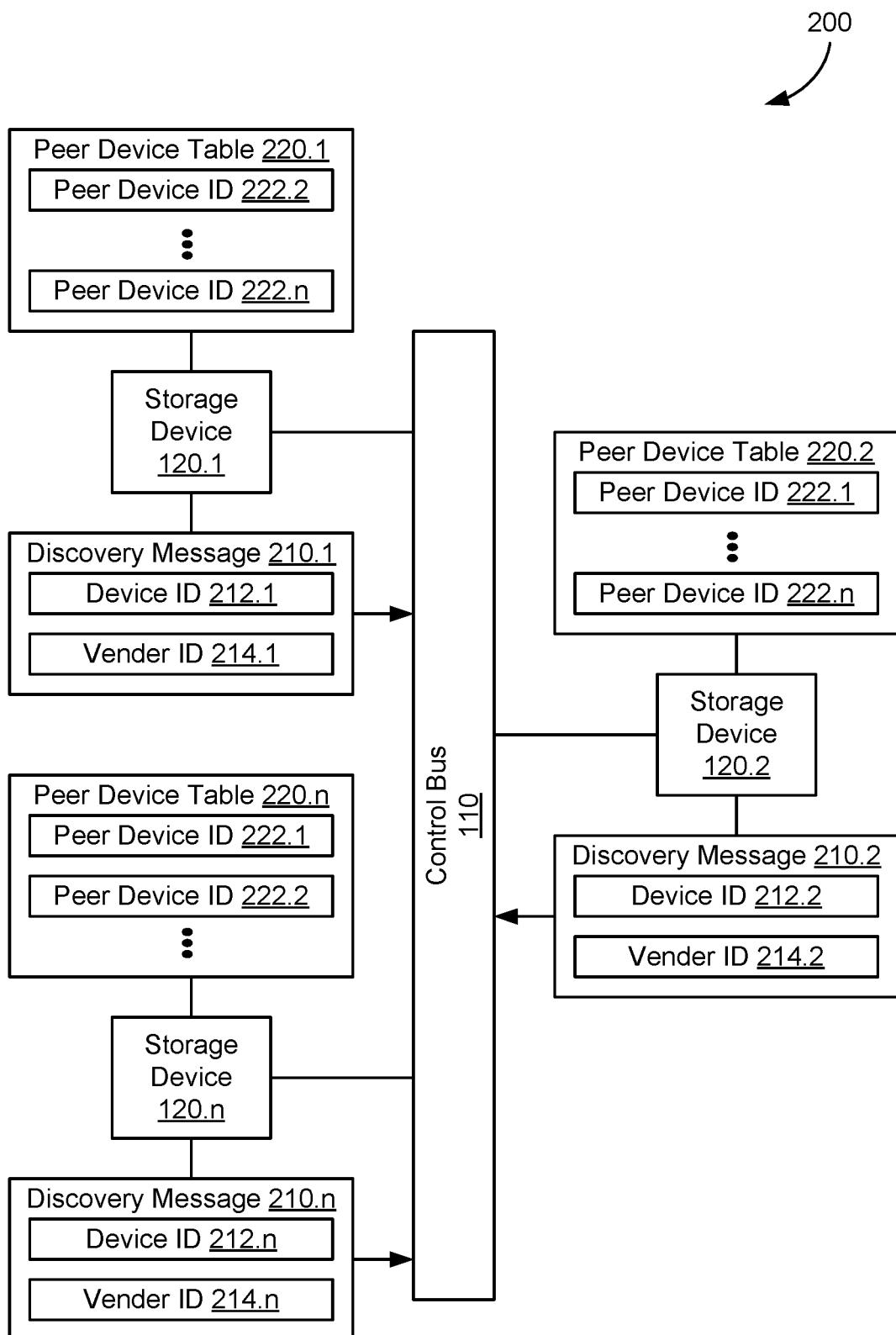
FIG. 2 schematically illustrates a peer discovery architecture that may be used by the multi-device storage system of FIG. 1.

FIG. 2 shows a schematic representation of an example storage system 200, such as multi-device data storage system 100 in FIG. 1, configured with a peer discovery architecture to support peer messaging through control bus 110. Storage devices 120 may each be connected to control bus 110 for low-bandwidth communication with a low-level physical management and power control subsystem, such as BMC 106 in FIG. 1. In some embodiments, control bus 110 supports a multi-master, packet-based messaging system that may enable storage devices 120.1 to establish communication with peer storage devices through control bus 110, in addition to their communication with BMC 106 or other system components. Peer messaging through control bus 110 may be independent of any communication through a primary host interface or fabric interface, such as storage interface bus 108 in FIG. 1.

Each peer storage device 120.1-120.n connected to control bus 110 may be configured to initiate a discover message 210. Discovery message 210 may be broadcast to control bus 110 during start up or initialization. For example, storage device 120 may use the control bus protocol to establish priority or temporary master control of control bus 110 and send a broadcast message that is received by all other devices connected to control bus 110. Storage device 120.1 may thereby send discovery message 210.1 to storage devices 120.2-120.n and each peer storage device may do the same in turn during a system initialization, power cycle, or reboot. Each peer storage device 120 connected to control bus 110 may receive a discovery message from each other peer storage device 120.

In some embodiments, discovery message 210 may include a device identifier 212 and a vender identifier 214. Device identifier 212 may include a unique identifier for that storage device relative to all other devices connected to control bus 110. In some embodiments, device identifier 212 may include a product serial number and/or a unique address assigned to the particular storage device. For example, each device connected to control bus 110 may be assigned a 7 bit address that uniquely identifies that device on control bus 110. Messages intended for that storage device will include the address in the message sequence and only the storage device with the matching address will process the content of the message. Messages may also be sent with a reserved broadcast or general call address for the message to be received and processed by all devices.

Vender identifier 214 may include a group identifier that designates storage devices meeting a specific set of criteria, such as storage devices manufactured or sold by a particular company or configured in accordance with a specific peer messaging protocol or standard. For example, vender identifier 214 may include a numeric identifier for storage devices from a specific vendor that are enabled for peer messaging over the control bus. Vendor identifiers may be defined and assigned by particular manufacturers, in accordance with working group or standard agreement, or through other means to assure that vendor identifiers are unique and serve to properly identify storage devices compatible with specific peer messaging protocols and content.

In some embodiments, each storage device 120 may use discovery messages 210 received from peer storage devices to populate an internal data structure for storing the addresses of one or more peer storage devices. For example, each storage device 120 may maintain peer device table 220 in an internal memory location to list the addresses, device identifiers 212, and/or vendor identifiers 214 of each other peer storage device attached to control bus 110. In some embodiments, peer device table 220 may include a series, list, or array, of peer device identifier entries 222. For example, each time a discovery message with a different device identifier 212 is received (and includes a corresponding vendor identifier 214 that denotes the device as a peer storage device for messaging purposes), that device identifier 212 may be entered in peer device table 220 as a new peer device identifier entry 222. After all discovery messages 210 have been received, each storage device 120 may include a complete peer device table 220 with the information necessary to send messages to each other peer storage device over control bus 110. In some embodiments, peer device tables 220 may also include additional data related to each peer device identifier. For example, each peer device entry may also include allocated host resource identifiers, access parameters for those host resources, and/or other information related to sharing host control data.

Figure 3:
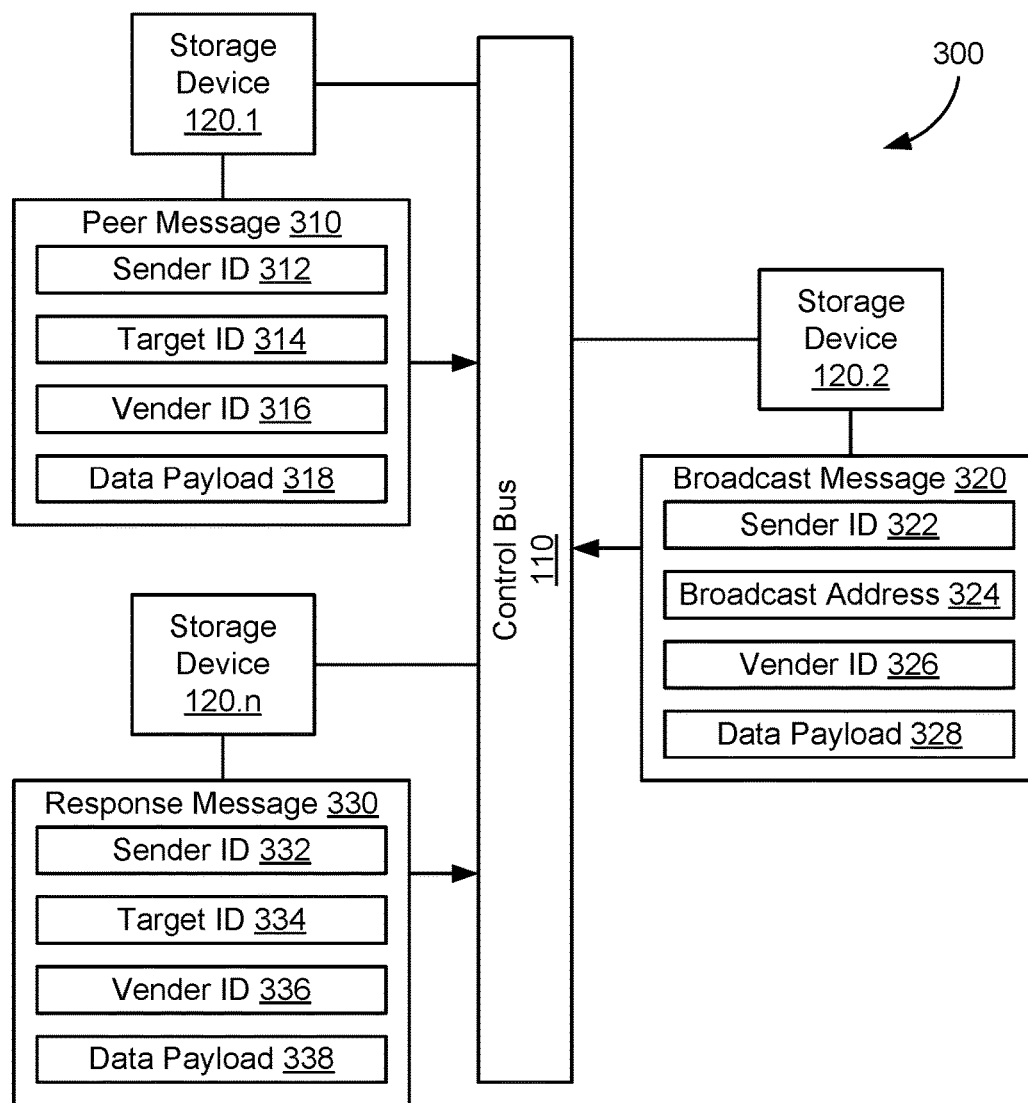
FIG. 3 schematically illustrates a peer messaging architecture that may be used by the multi-device storage system of FIG. 1.

FIG. 3 shows a schematic representation of an example storage system 300, such as multi-device data storage system 100 in FIG. 1, configured with a peer message architecture to support various types of peer messages 310, 320, 330 through control bus 110. Storage devices 120 may each be connected to control bus 110 for low-bandwidth communication with a low-level physical management and power control subsystem, such as BMC 106 in FIG. 1. In some embodiments, control bus 110 supports a multi-master, packet-based messaging system that may enable storage devices 120.1 to establish communication with peer storage devices through control bus 110, in addition to their communication with BMC 106 or other system components connected to control bus 110. For example, each storage device may be able to request or assert master control or priority in order to send messages through control bus 110 to peer storage devices operating as slaves. Peer messaging through control bus 110 may be independent of any communication through a primary host interface or fabric interface, such as storage interface bus 108 in FIG. 1.

Each peer storage device 120.1-120.n connected to control bus 110 may be configured to initiate one or more messages 310, 320, 330 using addresses and message syntax supported by control bus 110. While each example message is shown coming from a particular storage device 120, each storage device 120 may be configured to use any or all of the message types. Peer message 310 may be used by storage devices 120 to send direct messages to a target peer storage device, such as a message containing selected internal operation data for offload or backup, requesting previously stored internal operation data for recovery, and/or requesting or sending host control data. Broadcast message 320 may be used by storage devices 120 to send messages to all peer storage devices at once, such as a message containing internal operation data to be redundantly stored, requesting recovery of previously stored internal operation data, or requesting access to a host resource, such as a host memory buffer, allocated to a peer storage device, where more than one peer storage device may have the needed data or resource access. Response message 330 may be used by storage devices 120 to send messages back to a peer storage device that has requested data, such as responding to a recovery request by sending the requested internal operation data or responding to a host access request to provide host access parameters. For example, storage device 120.1 may send peer message 310 to storage device 120.n requesting access to the host storage buffer allocated to storage device 120.n and storage device 120.n may respond with response message 330 containing the set of access parameters needed by storage device 120.1 to access the host memory buffer allocated to storage device 120.n. In some embodiments, storage devices 120 may use peer message 310 and response message 330 to coordinate use of a host resource, such as allocating space in the host memory buffer assigned to one of the storage devices for use among two or more storage devices. Note that response message 330 includes data payload and, in some embodiments, may require the sending storage device to have master control or priority and may be distinguished from simple acknowledgement messages that may be part of the slave's message handling protocol.

In some embodiments, peer message 310 may include a sender identifier 312, a target identifier 314, a vender identifier 316, and a data payload 318. For example, sender identifier 312 may include the device identifier for the sending storage device and/or control bus address of the sending storage device. Target identifier 314 may include the device identifier for the target storage device and/or control bus address of the target storage device. In some embodiments, target identifier 314 may include a device identifier that is separate from the control bus address used by devices on control bus 110 to determine the target device. Vender identifier 316 may include a vender identifier as described above with regard to vender identifiers 214 in FIG. 2. Data payload 318 may include data generated by the sending storage device, such as storage device 120.1, to be stored by the target peer storage device. For example, data payload 318 may include internal operation data identified for offload or backup on other storage devices or access parameters for a host resource allocated to storage device 120.1. In some embodiments, data payload 318 may include recovery parameters describing previously offloaded or stored data that is needed by the sending storage device for data recovery, such as recovering lost event logs, debug data, or last good page data.

In some embodiments, broadcast message 320 may include a sender identifier 322, a broadcast address 324, a vender identifier 326, and a data payload 328. For example, sender identifier 322 may include the device identifier for the sending storage device and/or control bus address of the sending storage device. Broadcast address 324 may include a reserved address, header tag, or similar identifier to denote a broadcast message that should be sent to all devices on control bus 110. Vender identifier 326 may include a vender identifier as described above with regard to vender identifiers 214 in FIG. 2. Data payload 328 may include data generated by the sending storage device, such as storage device 120.1, to be stored by one or more peer storage devices. For example, data payload 328 may include internal operation data identified for offload or backup on other storage devices or a set of access parameters for one or more host resources. In some embodiments, data payload 318 may include recovery parameters describing previously offloaded or stored data that is needed by the sending storage device for data recovery, such as recovering lost event logs, debug data, or last good page data.

In some embodiments, response message 330 may include a sender identifier 332, a target identifier 334, a vender identifier 336, and a data payload 338. Response message 330 may differ from peer message 310 in that it may be responsive to receipt of peer message 310. For example, peer message 310 may include a host access request that includes parameters describing a host resource, such as the host memory buffer allocated to the target storage device, and response message 330 may respond to peer message 310 with the requested set of access parameters. As another example, peer message 310 may include a recovery request that includes parameters describing previously stored internal operation data and response message 330 may respond to peer message 310 with the requested recovery data. Sender identifier 332 may include the device identifier for the sending storage device and/or control bus address of the sending storage device. Target identifier 334 may include the device identifier for the target storage device and/or control bus address of the target storage device, generally the storage device from which the recovery request was received. Vender identifier 336 may include a vender identifier as described above with regard to vender identifiers 214 in FIG. 2. Data payload 338 may include data previously stored by the sending storage device from and about the requesting storage device, which may now be the target peer storage device for response message 330. For example, data payload 318 may include internal operation data identified for recovery to the target storage device that requested the recovery data.

Figure 4:
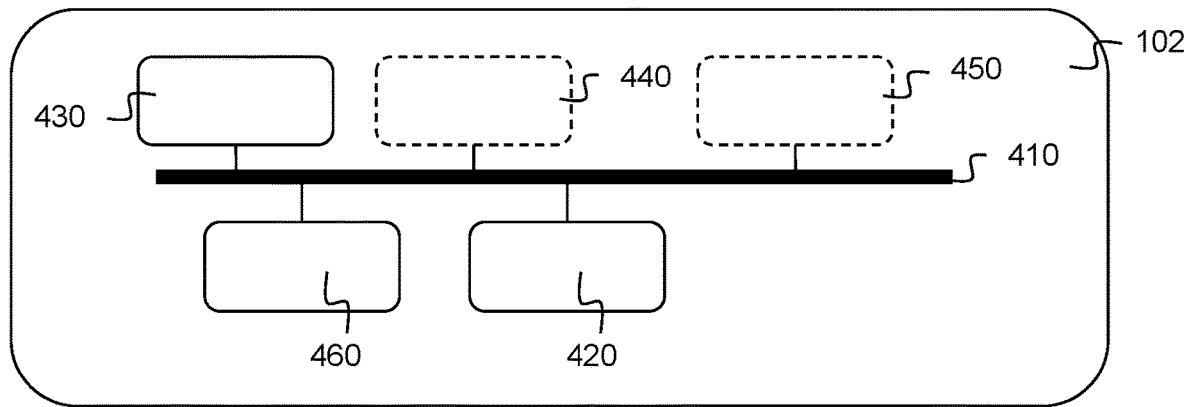
FIG. 4 schematically illustrates a host node of the multi-device storage system of FIG. 1.

FIG. 4 shows a schematic representation of an example host system 102. Host system 102 may comprise a bus 410, a processor 420, a local memory 430, one or more optional input units 440, one or more optional output units 450, and a communication interface 460. Bus 410 may include one or more conductors that permit communication among the components of host 102. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. For example, host driver 116 in FIG. 1 may be instantiated in instructions, operations, or firmware stored in local memory 430 for execution by processor 420. An optional input unit 440 may include one or more conventional mechanisms that permit an operator to input information to host 102 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 102 to communicate with other devices and/or systems. In some embodiments, communication interface 460 may include one or more peripheral interfaces, such as a PCIe interface for connecting to storage devices 120.

Figure 5:
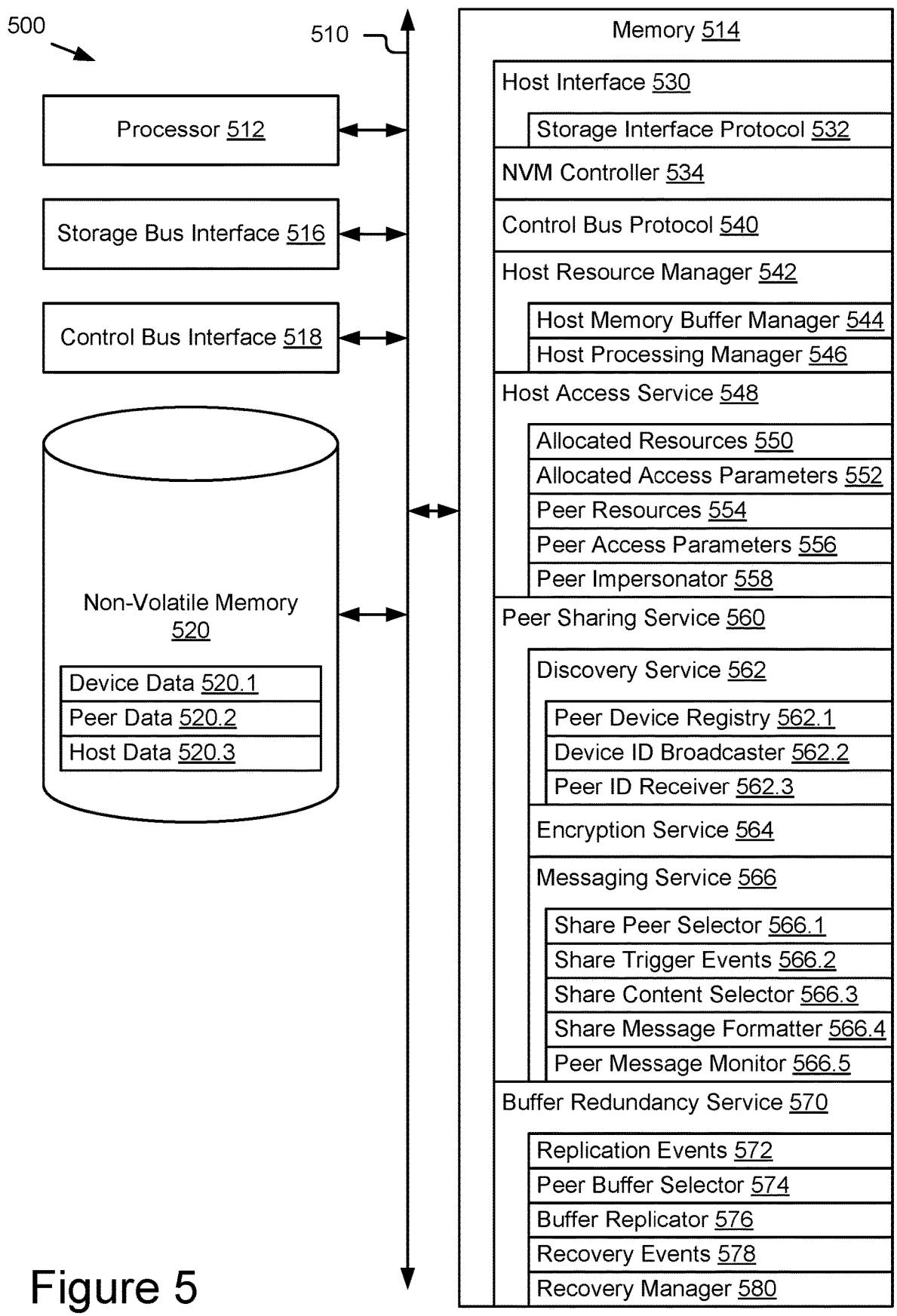
FIG. 5 schematically illustrates some elements of the storage devices of FIG. 1-3 in more detail.

FIG. 5 schematically shows selected modules of a storage device 500 configured for peer sharing of host resources, such as storage devices 120. Storage device 500 may incorporate elements and configurations similar to those shown in FIGS. 1-4. For example, storage device 500 may be configured as a storage device 120 in a set of peer storage devices interconnected by a control bus and including a host or storage bus interface for accessing host resources and transferring host data in a multi-device data storage system.

Storage device 500 may include a bus 510 interconnecting at least one processor 512, at least one memory 514, and at least one interface, such as storage bus interface 516 and control bus interface 518. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage bus interface 516 may include a physical interface for connecting to a host using an interface protocol that supports storage device access. For example, storage bus interface 516 may include a PCIe, SATA, SAS, or similar storage interface connector supporting NVMe access to solid state media comprising non-volatile memory devices 520. Control bus interface 518 may include a physical interface for connecting to a control bus using a low-bandwidth interface protocol for low-level control messaging among computing components. For example, control bus interface 518 may include a I2C, I3C, SMBus, or similar bus interface connector supporting component-to-component messaging, such as multi-master, packet-based messaging over a two-wire bus.

Storage device 500 may include one or more non-volatile memory devices 520 configured to store host data. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cell (MLC), or triple-level cells.

Storage system 500 may include a plurality of modules or subsystems that are stored and/or instantiated in memory 514 for execution by processor 512 as instructions or operations. For example, memory 514 may include a host interface 530 configured to receive, process, and respond to host data requests from client or host systems. Memory 514 may include a non-volatile memory (NVM) controller 534 configured to manage read and write operations to non-volatile memory devices 520. Memory 514 may include a control bus protocol 540 configured manage communication over control bus interface 518 in accordance with a determined protocol or standard. Memory 514 may include a host resource manager 542 configured to manage host resources allocated to storage device 500. Memory 514 may include a host access service 548 configured to access host resources, both those allocated to storage device 500 and those of peer storage devices based on shared host control data. Memory 514 may include a peer sharing service 560 configured for communication among storage devices attached to the same control bus as storage device 500 and used for sharing host control data. Memory 514 may include a buffer redundancy service 570 configured to use peer host memory buffers to provide redundancy for the allocated host memory buffer of storage device 500.

Host interface 530 may include an interface protocol and/or set of functions and parameters for receiving, parsing, responding to, and otherwise managing host data requests from a host. For example, host interface 530 may include functions for receiving and processing host requests for reading, writing, modifying, or otherwise manipulating data blocks and their respective client or host data and/or metadata in accordance with host communication and storage protocols. In some embodiments, host interface 530 may enable direct memory access and/or access over NVMe protocols through storage bus interface 516 to host data units 520.3 stored in non-volatile memory devices 520. For example, host interface 530 may include host communication protocols compatible with PCIe, SATA, SAS, and/or another bus interface that supports use of NVMe and/or RDMA protocols for data access to host data 520.3. Host interface 530 may further include host communication protocols compatible with accessing host resources from storage device 500, such host memory buffers, host CPU cores, and/or specialized assistance for computational tasks.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over storage bus interface 516. For example, storage interface protocol 532 may include both PCIe and NVMe compliant communication, command, and syntax functions, procedures, and data structures. In some embodiments, host interface 530 may include additional modules (not shown) for command handling, buffer management, storage device management and reporting, and other host-side functions.

NVM controller 534 may include an interface protocol and/or set of functions and parameters for reading, writing, and deleting data units in non-volatile memory devices 520. For example, NVM controller 534 may include functions for executing host data operations related to host storage commands received through host interface 530. For example, PUT or write commands may be configured to write host data units to non-volatile memory devices 520. GET or read commands may be configured to read data from non-volatile memory devices 520. DELETE commands may be configured to delete data from non-volatile memory devices 520, or at least mark a data location for deletion until a future garbage collection or similar operation actually deletes the data or reallocates the physical storage location to another purpose. In some embodiments, NVM controller 534 may include flash translation layer (FTL) management, data state machine, read/write buffer management, NVM device interface protocols, NVM device configuration/management/maintenance, and other device-side functions. In some embodiments, NVM controller 534 may be configured to allocate a portion of the memory locations in non-volatile memory devices 520 for storing data other than host data 520.3. For example, NVM controller 534 may allocate device data 520.1 as memory locations reserved for internal device data, including device configuration, parameter, and internal operation data. In some embodiments, NVM controller 534 may allocate peer data 520.2 as memory locations reserved for internal device data received from and about peer storage devices, including internal operation data from those peer storage devices. In some embodiments, storage space allocated to device data 520.1 and/or peer data 520.2 may be excluded from the storage capacity made available to host data 520.3, such as overprovisioned storage locations hidden from the host for use storing internal operation data, FTL tables, replacing bad blocks, etc.

Control bus protocol 540 may include interfaces, functions, and parameters for communication within the host or an associated baseboard management controller (BMC) using multi-master discovery and messaging compliant with a low-bandwidth interface standard. For example, storage device 500 may be configured for packet-based messaging through control bus interface 518 using a low-bandwidth bus protocol, such as I2C, I3C, SMBus, etc. Control bus protocol 540 may include a plurality of hardware and/or software modules configured to use processor 512, memory 514, and control bus interface 518 for communication with host components, including peer storage devices on the same control bus, using a control bus protocol supported by the connected control bus. In some embodiments, control bus protocol 540 may provide a low-bandwidth communication channel with the host and other system components to assist with power management, discovery, and access to external resources, such as temperature sensors, fan controllers, light emitting diode (LED) indicators, etc. For example, control bus interface 518 may connect storage device 500 to a BMC for monitoring the physical state of storage device 500. In some embodiments, control bus protocol 540 may provide the discovery and messaging functions used by peer sharing service 560.

Host resource manager 542 may include interface protocols and a set of functions and parameters for using host resources to complete operations for storage device 500. For example, host resource manager 542 may be configured to identify and manage host resources that the host makes available for direct access and use by storage device 500 and similar peer storage devices, such as host memory buffers and host processing services. Host resource manager 542 may include a plurality of hardware and/or software modules configured to use processor 512, memory 514, and host interface 530 for communication with host resources. For example, host resource manager 542 may include a host memory buffer manager 544 configured to manage a host memory buffer space in the host system that is allocated to storage device 500. Host resource manager 542 may include a host processing manager 546 configured to manage host processing services, such as CPU core processing or specialized computational processing engines. In some embodiments, host resource manager 542 may be configured to use host resources in accordance with the memory and processing needs of other storage device operations, such as the operations of NVM controller 534. For example, host memory buffer manager 544 may manage the allocation of host memory buffer space to cache recently or frequently used host data, host mapping data, and/or related FTL data. Host processing manager 546 may manage allocation of processing tasks, such as error correction code (ECC) encoding or decoding, to a host processor, such as an ECC engine. In some embodiments, host resource manager 542 may include or interface with host access service 548 for accessing host resources. In some embodiments, host resource manager 542 may include or interface with buffer redundancy service 570 for replicating buffer data stored in conjunction with host memory buffer manager 544. In some embodiments, host resource manager 542 may support use of allocated host resources by peer storage devices. For example, host resource manager 542 may include evaluation logic and rules for granting access to allocated host resources to peer storage devices and/or data structures for tracking peer access granted to allocated host resources.

Host access service 548 may include interface protocols and a set of functions and parameters for accessing host resources through host interface 530 to support host resource manager 542. For example, host access service 548 may use host access parameters to populate messages and/or access or session requests in accordance with storage interface protocol 532 to access host resources. In some embodiments, host access service 548 may provide access to peer host resources using peer access parameters received by peer sharing service 560. For example, host access service 548 may include or access a data structure that stores access parameters for host resources allocated to storage device 500 and host resources allocated to peer storage devices. Host access service 548 may include hardware and/or software modules configured to use processor 512, memory 514, and storage interface protocol 532 for establishing access to host resources through storage bus interface 518.

In some embodiments, allocated resources 550 may include data structures, functions, and/or interfaces configured to determine or identify the host resources that have been allocated to storage device 500. For example, allocated resources 550 may include a configuration table or other set of configuration parameters that identify host resources that the host system has allocated for access and use by storage device 500, such as a specific set of memory locations in a host memory buffer, identified CPU core, or other host resource. In some embodiments, allocated access parameters 552 may include data structures, functions, and/or interfaces configured to determine or identify a set of access parameters required by the host system to access allocated resources 550. For example, allocated access parameters 552 may include fields or entries in a configuration table or other set of configuration parameters that identify storage device credentials, such as a storage device identifier, a device access or authentication code, encryption key, etc., and/or access parameters, such as error correction schemes, feature settings, etc. In some embodiments, the host resources and sets of access parameters necessary for accessing the host resources may be defined by storage interface protocol 532. For example, storage device 500 and the host system may use an NVMe protocol that enables host memory buffer allocation and use and host access service 548 may be configured with allocated resources 550 and allocated access parameters 552 compliant with the NVMe protocol.

In some embodiments, peer resources 554 may include data structures, functions, and/or interfaces configured to determine or identify the host resources that have been allocated to a peer storage device that has shared or may share its access parameters with storage device 500. For example, peer resources 554 may include a configuration table or other set of configuration parameters that identify a peer storage device and host resources that the host system has allocated for access and use by that peer storage device, such as a specific set of memory locations in a host memory buffer, identified CPU core, or other host resource. In some embodiments, peer resources 554 may be used by storage device 500 to supplement their allocated host resources. For example, storage device 500 may need more memory space than their allocated host memory buffer can hold and use peer host memory buffer space for expanded memory space, or storage device 500 may need overflow processing, error correction, or another host resources when needs exceed the host allocation. In some embodiments, storage device 500 may use peer resources 554, such as peer host memory buffer, to backup its own internal operation data, such as debug data, operation logs, or other information helpful for restoring operations after a power cycle. In some embodiments, peer resources 554 may include data from peer storage devices stored in their own host memory buffers that may be of use to storage device 500. For example, peer storage devices may store parameters related to their own operational states in their host memory buffers and storage device 500 may be able to access and use those parameters without having to message or query the peer storage device. For example, peer storage devices may log power consumption, operations, capacity, error, wear, or other parameters to a memory location in their allocated host memory buffer and those parameters could be a peer resource for storage device 500. Storage device 500 may include algorithms to optimize its own resources, such as power consumption, based on the peer power consumption values available in peer resources 554.

In some embodiments, peer access parameters 556 may include data structures, functions, and/or interfaces configured to determine or identify a set of access parameters required by the host system to access peer resources 554. For example, peer access parameters 556 may include fields or entries in a configuration table or other set of configuration parameters that identify peer storage device credentials, such as a peer storage device identifier, a peer device access or authentication code, encryption key, etc., and/or peer access parameters, such as error correction schemes, feature settings, etc. In some embodiments, peer resources 554 and/or peer access parameters 556 may be received through peer sharing service 560. For example, peer resources 554 and/or peer access parameters 556 may be received over control bus interface 518 and stored in a peer device entry in peer device registry 562.1. In some embodiments, the host resources and sets of access parameters necessary for accessing the host resources may be defined by storage interface protocol 532. For example, storage device 500 and the host system may use an NVMe protocol that enables host memory buffer allocation and use and host access service 548 may be configured with peer resources 554 and peer access parameters 556 compliant with the NVMe protocol.

In some embodiments, host access service 548 may include a peer impersonator 558 configured to map peer access parameters 556 into messages and/or access or session requests that comply with storage interface protocol 532 and appear to the host to originate from the corresponding peer storage device. For example, peer impersonator 558 may employ a parameter mask or mapping function that replaces parameter values for allocated resources 550 and/or allocated access parameters 552 with sets of parameter values from peer resources 554 and/or peer access parameters 556. In some embodiments, peer access parameters 556 may include the addresses and ranges of the host memory locations allocated to the peer storage device, enabling storage device 500 to access specific memory locations in the peer host memory buffer. For example, peer impersonator 558 may use a PCIe configuration for host DRAM access based on direct memory access virtual addresses. Peer access parameters 556 may include the virtual addresses allocated to the peer storage device and knowledge of the virtual addresses may be sufficient for accessing the host memory bus from the same storage bus (which may be a generally trusted I/O path). In some embodiments, peer impersonator 558 may be configured to navigate an input-output memory management unit configured to map the virtual addresses visible to the storage devices to physical addresses on the host side. For example, an I/O remapping table may provide the address translation. In some embodiments, the host may include a memory protection layer to prevent faulty or malicious devices. In this case, peer impersonator 558 may be configured to include additional peer access parameters 556 to provide the interface credentials necessary to navigate or bypass the memory protection layer.

Peer sharing service 560 may include an interface protocol and set of functions and parameters for discovering peer storage devices and sending and receiving messages with those peer storage devices, such as sharing access parameters for host resources. For example, peer sharing service 560 may include functions for utilizing low-bandwidth communications through control bus interface 518 using control bus protocol 540. In some embodiments, peer sharing service 560 may include management of peer data 520.2 in non-volatile memory devices 520 for storing peer internal operation data and/or may support data encryption for encrypting internal operation data in transit and/or storing peer data 520.2 in an encrypted state.

In some embodiments, peer sharing service 560 may include a plurality of hardware and/or software modules configured to use processor 512 and memory 514 to handle or manage defined operations of peer sharing service 560. For example, peer sharing service 560 may include a discovery service 562, an encryption service 564, and/or a messaging service 566. For example, discovery service 562 may be configured to discover peer storage devices on a shared control bus and store their addresses for use by messaging service 566. Encryption service 564 may be configured to encrypt and/or decrypt payload data for messaging service 566 for transit, storage to peer data 520.2, and/or recovery and storage to device data 520.1. Messaging service 566 may be configured to send and receive one-to-one and/or broadcast messages to and from peer storage devices over the shared control bus.

Discovery service 562 may include data structures, functions, and interfaces for discovering peer devices on a control bus and determining peer device addresses for use by peer sharing service 560. For example, during initialization or startup of storage device 500, discovery service 562 may broadcast its device identifier or address and receive similar broadcasts from other devices to accumulate device information for other devices on the control bus. In some embodiments, discovery service 562 may include a peer device registry 562.1 configured to store storage device identifiers, control bus addresses, and/or other peer storage device information to establish and support communication with peer storage devices. For example, peer device registry 562.1 may include a data table or other data structure in memory 514 and/or device data 520.1 that includes a plurality of device identifier entries associated with corresponding control bus addresses. In some embodiments, discovery service 562 may include a device ID broadcaster 562.2 configured to determine the storage device identifier and/or control bus address for storage device 500 and broadcast a message on the control bus to enable other devices on the control bus to discover storage device 500. For example, device ID broadcaster 562.2 may be triggered during ROM, boot loader, or firmware execution at startup or initialization of storage device 500, in response to a discovery message from another device, and/or another device discovery trigger in accordance with control bus protocol 540. In some embodiments, discovery service 562 may include a peer ID receiver 562.3 configured to monitor communications through control bus interface 518, identify discovery broadcasts from other storage devices, and add a corresponding device identifier entry in peer device registry 520.1. For example, control bus protocol 540 may define syntax for broadcast messages, such as a broadcast address, a tag or similar parameter for designating a discovery broadcast, and data payload including the storage device identifier, control bus address, vendor identifier, etc. and peer ID receiver 562.3 may be configured according to parse messages meeting that syntax to extract peer storage device identifiers.

Encryption service 564 may include data structures, functions, and interfaces for encrypting and decrypting internal operation data 550 for sharing and/or storage. For example, encryption service 564 may include encryption key exchange with peer storage devices to establish encrypted messaging between peer storage devices and/or local-only encryption to enable encrypted internal operation data to be shared and/or stored, with only the source peer storage device capable of decrypting the encrypted data. In some embodiments, as internal operations in storage device 500 generate internal operation data 550, selected internal operation data may be encrypted by encryption service 564 and stored in device data 520.1 and/or sent to peer storage devices through messaging service 566. Messaging service 566 may send the encryption key to the peer storage device to enable decryption of the encrypted data payload by the peer storage device, prior to storing as peer data or upon subsequent access of peer data. In some embodiments, encryption service 564 may implement a selected encryption algorithm and standard for target internal operations data, such as advanced encryption standard (AES)-128 or another encryption standard.

Messaging service 566 may include data structures, functions, and interfaces for sending and receiving messages to and from peer devices over the control bus. For example, messaging service 566 may implement control bus protocol 540 to send and receive messages with other devices identified through discovery service 562. In some embodiments, messaging service 566 may send packetized data payloads over the control bus using block write and block read commands between buffers in the peer storage devices.

In some embodiments, messaging service 566 may include a share peer selector 566.1 configured to select a target or destination peer storage device to receive a message. For example, share peer selector 566.1 may include a parameter setting or algorithm for selecting a peer storage device to receive a request for host resource access parameters, such as the set of access parameters for the host memory buffer allocated to a selected peer storage device for replicating host memory buffer data of storage device 500 or an algorithm (randomizer, round-robin, etc.) for distributing buffer replication among the host memory buffers of peer storage devices. In some embodiments, messaging service 566 may include share trigger events 566.2 configured to determine when a request for peer access parameters is sent to one or more peer storage devices. For example, share trigger events 566.2 may include a plurality of rule-based conditions for triggering initialization or updating of peer resources 554 and/or peer access parameters 556, such as reset events, operation errors, successful startup, ungraceful shutdown, periodic update schedule, etc. In some embodiments, messaging service 566 may include a share content selector 566.3 configured to select the payload data content of messaging service 566. For example, share content selector 566.3 may include a set of parameters for determining host resource types and/or related peer access parameter types to be included in a resource access request sent to a peer storage device. In some embodiments, share content selector 566.3 may support response to peer host resource requests from other storage devices. For example, a peer storage device may request access to the host memory buffer allocated to storage device 500 and share content selector 566.3 may receive or access the requested allocated resources 550 and/or allocated access parameters 552 from host access service 548 to include in the payload data of the response message. Where multiple share trigger events 566.2 and/or host resources are supported by peer sharing service 560, a particular share trigger event may determine the target host resource and/or related peer access parameters, such as the host memory buffer access parameters for peer host memory buffer access or host CPU core access parameters for peer host CPU core access, etc. In some embodiments, messaging service 566 may include a share message formatter 566.4 configured to format a peer message in accordance with control bus protocol 540 to include the control bus address of the target peer storage device and the selected content in the data payload. For example, share message formatter 566.4 may generate or determine a header containing a control bus address and a read/write flag, followed by data payload and/or other parameters, such as command codes and/or error codes, to convey the selected internal operation data.

In some embodiments, messaging service 566 may include a peer message monitor 566.5 configured to monitor control bus interface 518 for messages from peer storage devices addressed to storage device 500 (directly or via broadcast). For example, peer message monitor 566.5 may receive peer messages over the control bus that are initiated by peer storage devices and/or responsive to messages sent by messaging service 566. Peer message monitor 566.5 may parse received messages to determine whether further action is necessary, such as storing peer data, adding or updating peer resources 554 or peer access parameters 556, and/or passing peer access requests to host resource manager 542.

Buffer redundancy service 570 may include interface protocols and a set of functions and parameters for using host memory buffers through host interface 530 to support replication, management, and recovery of buffer data by distributing buffer data to one or more peer host memory buffers. For example, buffer redundancy service 570 may use host resource manager 542 and host access service 548 to populate messages and/or access or session requests in accordance with storage interface protocol 532 to store buffer data to and/or retrieve buffer data from host memory buffers allocated to peer storage devices. In some embodiments, buffer redundancy service 570 may access peer host memory buffers using peer access parameters received by peer sharing service 560. Buffer redundancy service 570 may include hardware and/or software modules configured to use processor 512, memory 514, and storage interface protocol 532 for managing redundant buffer data through storage bus interface 518. For example, buffer redundancy service 570 may include replication events 572, peer buffer selector 574, buffer replicator 576, recovery events 578, and/or recovery manager 580.

In some embodiments, buffer redundancy service 570 may include replication events 572 configured to determine when buffer data should be replicated for later use by storage device 500. For example, replication events 572 may include a rules-based set of event conditions or parameters that trigger replication of buffer data to a peer host memory buffer, such as detection of a power mode change operation (entering a low power mode), power cycling, or selected error condition. In some embodiments, host resource manager 542 may initiate a replication event responsive to a buffer state, such as allocated host buffer memory being full or exceeding a buffer usage threshold. In some embodiments, buffer redundancy service 570 may include a peer buffer selector 574 configured to select or determine the peer storage device and/or corresponding host memory buffer allocated to the peer storage device as the replication destination. For example, peer buffer selector 574 may use host resource manager 542 and/or host access service 548 to identify the peer storage device or devices with corresponding host memory buffers accessible to host access service 548. In some embodiments, buffer replicator 576 may be configured to read buffer data from the host memory buffer allocated to storage device 500 and write the buffer data to the destination host memory buffer of the selected peer storage device. For example, buffer replicator 576 may use host access service 548 to establish read access to the allocated host memory buffer for storage device 500 and write access to the host memory buffer allocated to the selected peer storage system. In some embodiments, buffer replicator 576 may use an RDMA protocol over storage bus interface 516 for direct memory access to the two host memory buffers. For example, buffer replicator 576 may use allocated access parameters 552 for direct memory access to the allocated host memory buffer for storage device 500 and peer impersonator 558 for direct memory access to the peer host memory buffer. In some embodiments, buffer replicator 576 may be configured to select a portion of the buffer data for replication, so as cache data with meeting a defined recency threshold or input/output access threshold. For example, only buffer data cached in the past X seconds or with Y input/output operations per second may be replicated. In some embodiments, buffer replicator 576 may be configured for buffer recovery as well and may operate in the opposite direction to read buffer data from peer host memory buffers and write buffer data to the host memory buffer allocated to storage device 500.

In some embodiments, buffer redundancy service 570 may include recovery events 578 configured to determine when buffer data should be recovered from host memory buffers allocated to peer storage devices. For example, recovery events 578 may include a rules-based set of event conditions or parameters that trigger recovery of buffer data to the allocated host memory buffer for storage device 500, such as detection of a power mode change operation (return to normal power mode), power cycling, startup, or selected error condition. In some embodiments, host resource manager 542 may initiate a recovery event responsive to a buffer state, such as a host memory buffer access error or initialization of an empty host memory buffer. In some embodiments, buffer redundancy service 570 may include a recovery manager 580 configured to manage the recovery of buffer data stored in one or more peer host memory buffer spaces. For example, recovery manager 580 may be configured to identify peer storage devices and corresponding host memory buffers that may include buffer data from storage device 500 and evaluate the located buffer data to determine whether it meets recovery event conditions. Buffer data portions identified as valid and meeting the recovery event may be identified to host resource manager 542 and/or buffer replicator 576 for replication back to the allocated host memory buffer for storage device 500.

Figure 6:
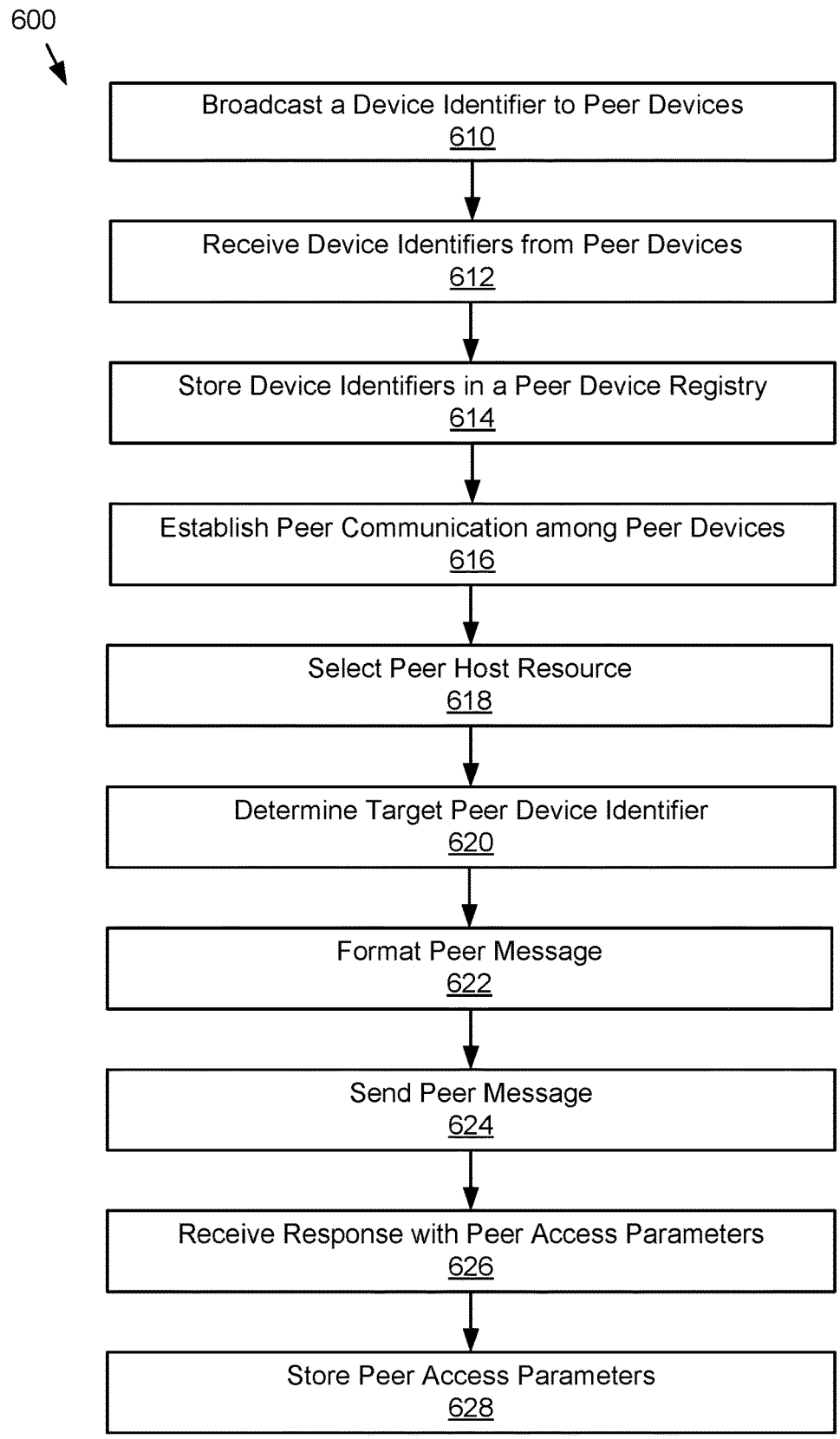
FIG. 6 is a flowchart of an example method of sharing peer access parameters among peer storage devices using a control bus.

As shown in FIG. 6, storage device 500 may be operated according to an example method for sharing peer access parameters among peer storage devices using a control bus, i.e. according to method 600 illustrated by blocks 610-628 in FIG. 6.

At block 610, a device identifier may be broadcast to peer devices over a control bus. For example, a discovery service complying with the control bus protocol may send a broadcast message identifying the storage device and its control bus address.

At block 612, device identifiers may be received from peer devices over the control bus. For example, the discovery service may also receive broadcast messages identifying other storage devices on the same control bus, along with their control bus addresses. These peer discovery messages may be received responsive to the storage device's broadcast at block 610, initiated as part of the startup or initialization of each peer storage device, and/or based on a master discovery trigger or broadcast.

At block 614, device identifiers from the peer devices may be stored in a peer device registry of the storage device. For example, the discovery service may store storage device identifiers, control bus addresses, and/or other information related to each peer storage device in a peer storage device entry in the peer device registry.

At block 616, peer communication may be established among the peer storage devices. For example, the peer device registry may contain the information necessary for addressing messages to peer storage devices and a peer messaging service may be configured to send broadcast and/or direct messages to the peer storage device using the control bus protocol.

At block 618, a peer host resource may be selected. For example, a host resource manager may determine that additional host resources are needed, such as a peer host memory buffer, and use a peer device registry to determine one or more target peer storage devices from which host resource access may be acquired.

At block 620, a target peer device identifier may be determined for the access request message. For example, the messaging service may retrieve a target peer device identifier and/or control bus address information for the storage devices corresponding to the selected peer host resource for sending the access request message.

At block 622, a peer message may be formatted to comply with the control bus protocol. For example, the messaging service may package the selected host resource access request as the data payload and/or use an access request message type enabled by the control bus protocol in one or more peer messages with appropriate address headers for the target peer storage device.

At block 624, the peer message may be sent from the storage device requesting access to the host resources allocated to a peer storage device over the control bus. For example, the messaging service may send the peer message generated at block 622 through a control bus interface.

At block 626, a response may be received with the peer access parameters. For example, the target peer storage device may receive and process the host resource access request and return a set of access parameters to enable the requesting storage device to access the host resource through the storage interface. The set of access parameters may be sent by response message over the control bus and received by the requesting storage device.

At block 628, the peer access parameters for host resources may be stored. For example, a host access service may store the peer access parameters received at block 626 for use in accessing the host resources allocated to the peer storage device by impersonating that peer storage device, such as by storing them in the peer device registry entry associated with the peer storage device identifier.

Figure 7:
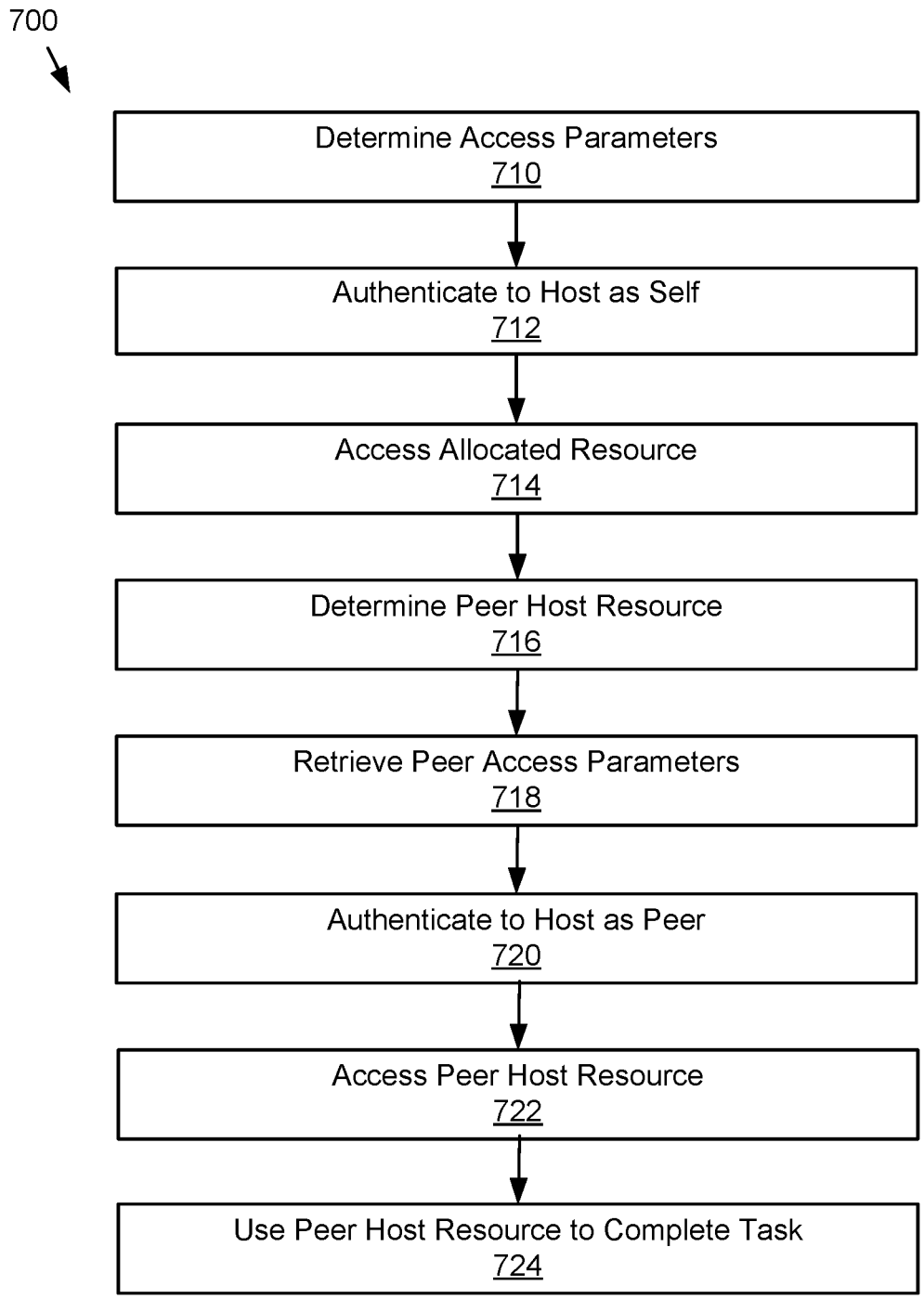
FIG. 7 is a flowchart of an example method of accessing a peer host resource.

As shown in FIG. 7, storage device 500 may be operated according to an example method for accessing a host resource allocated to a peer storage device, i.e. according to method 700 illustrated by blocks 710-720 in FIG. 7.

At block 710, a set of access parameters may be determined for a storage device to access one or more host resources allocated to that storage device. For example, during configuration or initialization, a storage device may be configured with a set of access parameters related to a storage device identifier and a specific host resource, such as a set of memory locations for a host memory buffer.

At block 712, the storage device may authenticate to the host as itself. For example, during normal operation a host access service of the storage device may use the access parameters assigned to the storage device and provide those access parameters to the host in order to be authenticated by the host for access one or more host resources over the storage interface.

At block 714, the allocated host resource may be accessed. For example, in response to message, access, or session authentication at block 712, the storage device may use the allocated host resource as enabled by the storage interface protocols and any constraints placed on the host resource by the host system, such as use of an allocated memory space in host DRAM as a host memory buffer or a host processing resource allocated for the storage device's use.

At block 716, a peer host resource may be determined. For example, a host resource manager in the storage device may determine that additional host resources are needed beyond those allocated to the storage device and a peer storage device and associated host resource may be selected for use.

At block 718, peer access parameters for the peer storage device and peer host resource may be retrieved. For example, the host resource manager may use a host access service that previously stored a set of peer access parameters for the target peer host resource, such as peer access parameters stored in accordance with method 600 above.

At block 720, the storage device may authenticate to the host as the peer storage device. For example, the host access service may include a peer impersonator configured to use the peer access parameters assigned to the peer storage device and provide those peer access parameters to the host in order to be authenticated by the host for access one or more host resources allocated to the peer storage device.

At block 722, the peer host resource may be accessed. For example, in response to message, access, or session authentication at block 720, the storage device may use the peer host resource as enabled by the storage interface protocols and any constraints placed on the host resource by the host system (for the peer storage device), such as use of an allocated memory space in host DRAM that is the host memory buffer for the peer storage device.

At block 724, the peer host resource may be used by the storage system to complete a task. For example, the host resource manager may use the peer host resource as an extension of the host resources allocated to the storage device and/or may use the peer host resource for another task, such as the replication and recovery of buffer data described with regard to method 900.

Figure 8:
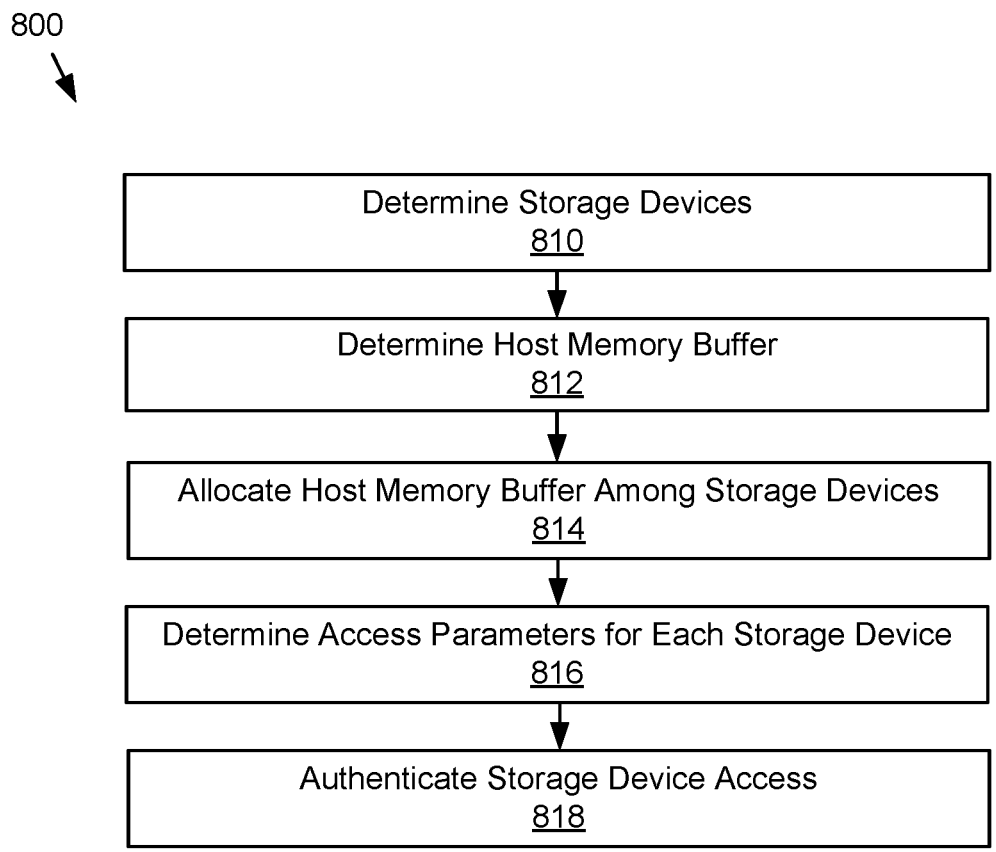
FIG. 8 is a flowchart of an example method of managing access to host memory buffers.

As shown in FIG. 8, storage device 500 may be operated according to an example method for managing access to host memory buffers, i.e. according to method 800 illustrated by blocks 810-818 in FIG. 8.

At block 810, a set of storage devices may be determined. For example, a multi-device storage system may include an enclosure with a plurality of storage devices connected to a host system through a host interface, such as PCIe interface, and a host driver may identify the connected storage devices.

At block 812, a host memory buffer space may be determined. For example, the host system may include a memory configuration in the host driver that allocates a fixed or variable amount of DRAM for use by the storage devices identified at block 810.

At block 814, the host memory buffer space may be allocated among the set of storage devices. For example, the host driver may allocate a fixed or variable subset of the host memory space allocated for the host memory buffer at block 812 to each storage device in the set of storage devices.

At block 816, access parameters may be determined for each storage device. For example, the host driver may associate a set of access parameters with a storage device identifier for each of the storage devices to enable each storage device to access the host memory buffer space allocated to that storage device.

At block 816, storage device access parameters may be authenticated when a storage device attempts to access the host memory buffer allocated to that storage device. For example, each message, session, or access of the host memory buffer by a storage device may require that storage device to include the access parameters within the access communications and/or a separate authentication process managed by the host driver and the host driver checks the access parameters against the access parameters determined at block 816. The host driver may grant or deny access to the host memory buffer depending on the outcome of the comparison of the stored access parameters to the access parameters provided in the access attempt.

Figure 9:
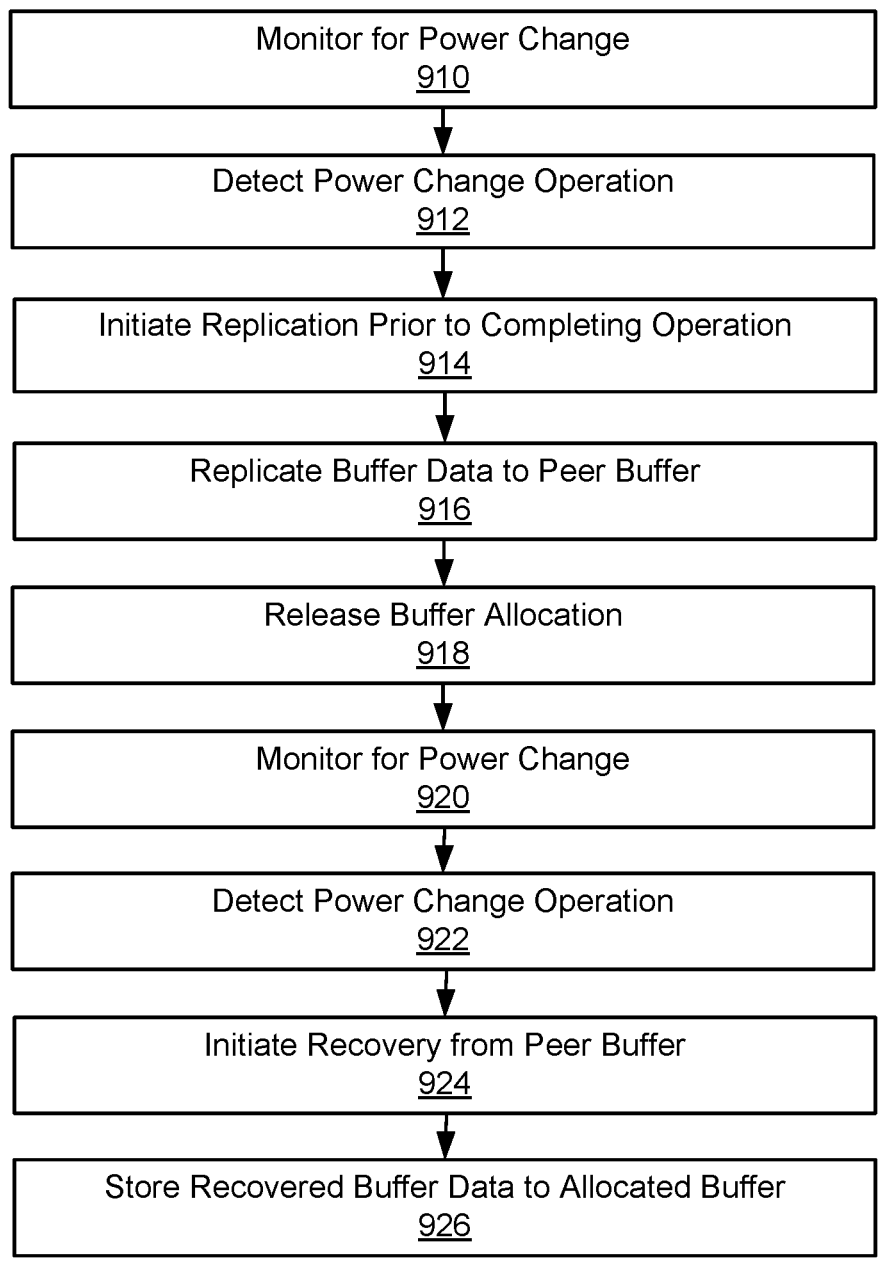
FIG. 9 is a flowchart of an example method of backing up buffer data during power mode changes.

As shown in FIG. 9, storage device 500 may be operated according to an example method for backing up buffer data to peer host memory buffers during power mode changes, i.e. according to method 800 illustrated by blocks 910-926 in FIG. 9.

At block 910, a storage device may monitor for a power change. For example, a buffer redundancy service may monitor for replication events that include changes in power mode, such as a low power mode change operation.

At block 912, a power mode change operation may be detected. For example, the buffer redundancy service may detect that initiation of a lower power mode change by the storage device, host, and/or BMC administrator meets the replication event conditions.

At block 914, replication may be completed prior to completing the power mode change operation. For example, the buffer redundancy service may initiate a replication task in a queue of prerequisite tasks to be completed before low power mode may be entered and the power usage of the storage device reduced.

At block 916, buffer data may be replicated to a peer host memory buffer. For example, the buffer redundancy service may replicate some or all of the buffer data in the host memory buffer allocated to the storage device to the host memory buffer allocated to a peer storage device, using peer storage device impersonation as described for method 700 above. Buffer data may be read from the allocated host memory buffer and written to one or more selected peer host memory buffers.

At block 918, the host memory buffer allocation for the storage device may be released. For example, the host memory buffer may be released as part of the low power mode operation and the contents of the host memory buffer allocated to the storage device may be lost.

At block 920, the storage device may monitor for another power change. For example, the buffer redundancy service may monitor for recovery events that include changes in power mode, such as a return to normal power mode.

At block 922, a power mode change operation may be detected. For example, the buffer redundancy service may detect that initiation of a normal power mode change operation by the storage device, host, and/or BMC administrator meets the recovery event conditions.

At block 924, recovery of buffer data may be initiated as part of or following the return to normal power mode. For example, the buffer redundancy service may initiate a recovery task in response to the return to normal power mode and replacing or supplementing the re-initialization of the host memory buffer allocated to the storage device.

At block 926, the recovered buffer data may be stored in the allocated host memory buffer. For example, the buffer redundancy service may read the previously stored buffer data from the peer host memory buffer and write the recovered buffer data back to the re-initialized host memory buffer allocated to the storage device.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
 a first storage device comprising:
  a storage interface configured to connect to a host system;
  a storage medium configured to store host data; and
  a host access service configured to:
   access, using a first set of access parameters of the first storage device, a first host resource allocated to the first storage device;
   receive a second set of access parameters from a second storage device among a plurality of peer storage devices; and
   access, using the second set of access parameters of the second storage device, a second host resource allocated to the second storage device.

2. The system of claim 1, wherein the first storage device further comprises:
 a control bus interface configured to connect to a control bus, wherein the plurality of peer storage devices are configured to connect to the control bus; and
 a peer messaging service configured to:
  establish peer communication with the plurality of peer storage devices over the control bus;
  receive, through the control bus interface, the second set of access parameters from the second storage device; and
  pass the second set of access parameters to the host access service.

3. The system of claim 2, wherein the peer messaging service is further configured to:
 select the second storage device from the plurality of peer storage devices; and
 send, to the second storage device and through the control bus interface, a peer message requesting the second set of access parameters.

4. The system of claim 1, wherein the host access service is further configured to:
 receive, from each storage device of the plurality of peer storage devices, corresponding sets of access parameters; and store the corresponding sets of access parameters in a peer device registry.

5. The system of claim 4, wherein:
the peer device registry includes a peer device entry corresponding to each storage device of the plurality of peer storage devices; and
each peer device entry includes:
a peer device identifier;
the corresponding set of access parameters; and
a host resource description for a host resource configured for access with the corresponding set of access parameters.

6. The system of claim 1, further comprising the host system, the host system including:
a host processor;
a host storage interface configured to communicate with the first storage device and the plurality of peer storage devices; and
a host memory, wherein:
the host memory includes a plurality of host memory buffers;
the host system is configured to allocate each host memory buffer of the plurality of host memory buffers to a corresponding storage device selected from the first storage device and the plurality of peer storage devices;
the first host resource includes a first host memory buffer allocated to the first storage device; and
the second host resource includes a second host memory buffer allocated to the second storage device.

7. The system of claim 6, wherein the host system is further configured to:
determine the first set of access parameters for the first storage device;
provide the first set of access parameters to the first storage devices;
authenticate the first set of access parameters for storage device access to the first host resource;
determine the second set of access parameters for the second storage device;
provide the second set of access parameters to the second storage device; and
authenticate the second set of access parameters for storage device access to the second host resource.

8. The system of claim 6, wherein the first storage device further comprises:
a buffer redundancy service configured to replicate, using the first set of access parameters and the second set of access parameters, buffer data from the first host memory buffer to the second host memory buffer.

9. The system of claim 8, wherein the buffer redundancy service is further configured to recover, using the first set of access parameters and the second set of access parameters, buffer data from the second host memory buffer to the first host memory buffer.

10. The system of claim 9, wherein the buffer redundancy service is further configured to:
monitor the first storage device for a first change in power mode operation;
initiate, responsive to the first change in power mode operation, the replication of the buffer data from the first host memory buffer to the second host memory buffer;
release, responsive to replicating the buffer data, the first host memory buffer allocated to the first storage device;
monitor the first storage device for a second change in power mode operation; and
initiate, responsive to the second change in power mode operation, recovery of the buffer data from the second host memory buffer to the first host memory buffer.

11. A computer-implemented method, comprising:
accessing, from a first storage device and using a first set of access parameters, a first host resource allocated to the first storage device;
receiving, at the first storage device, a second set of access parameters from a second storage device among a plurality of peer storage devices; and
accessing, from the first storage device and using the second set of access parameters of the second storage device, a second host resource allocated to the second storage device.

12. The computer-implemented method of claim 11, further comprising:
establishing, from the first storage device and over a control bus, peer communication with the plurality of peer storage devices, wherein:
the first storage device and each storage device of the plurality of peer storage devices include:
a host interface configured to connect to a host system; and
a control bus interface configured to connect to the control bus; and
receiving the second set of access parameters is over the control bus.

13. The computer-implemented method of claim 12, further comprising:
determining, by the first storage device, the second storage device from the plurality of peer storage devices; and
sending, from the first storage device to the second storage device and over the control bus, a peer message requesting the second set of access parameters.

14. The computer-implemented method of claim 11, further comprising:
receiving, at the first storage device and from each storage device of the plurality of peer storage devices, corresponding sets of access parameters; and
storing, by the first storage device, the corresponding sets of access parameters in a peer device registry.

15. The computer-implemented method of claim 14, wherein:
storing the corresponding sets of access parameters in the peer device registry includes storing a peer device entry corresponding to each storage device of the plurality of peer storage devices; and
each peer device entry includes:
a peer device identifier;
the corresponding set of access parameters; and
a host resource description for a host resource configured for access with the corresponding set of access parameters.

16. The computer-implemented method of claim 11, further comprising:
allocating each host memory buffer of a plurality of host memory buffers to a corresponding storage device selected from the first storage device and the plurality of peer storage devices, wherein:
the first host resource includes a first host memory buffer allocated to the first storage device; and
the second host resource includes a second host memory buffer allocated to the second storage device.

17. The computer-implemented method of claim 16, further comprising:
- determining the first set of access parameters for the first storage device;
- authenticating, by a host system including the plurality of host memory buffers, the first set of access parameters for storage device access to the first host resource;
- determining the second set of access parameters for the second storage device; and
- authenticating, by the host system, the second set of access parameters for storage device access to the second host resource.

18. The computer-implemented method of claim 16, further comprising:
- replicating, by the first storage device using the first set of access parameters and the second set of access parameters, buffer data from the first host memory buffer to the second host memory buffer; and
- recovering, by the first storage device using the first set of access parameters and the second set of access parameters, buffer data from the second host memory buffer to the first host memory buffer.

19. The computer-implemented method of claim 18, further comprising:
- monitoring the first storage device for a first change in power mode operation;
- initiating, responsive to the first change in power mode operation, the replication of the buffer data from the first host memory buffer to the second host memory buffer;
- releasing, responsive to replicating the buffer data, the first host memory buffer allocated to the first storage device;
- monitoring the first storage device for a second change in power mode operation; and
- initiating, responsive to the second change in power mode operation, recovery of the buffer data from the second host memory buffer to the first host memory buffer.

20. A storage system comprising a plurality of storage devices, wherein each storage device comprises:
- a storage interface configured to connect to a host system;
- a control bus interface configured to connect to a control bus;
- a storage medium configured to store host data;
- means for accessing, using an allocated set of access parameters of that storage device, an allocated host resource allocated to that storage device;
- means for receiving, over the control bus, a peer set of access parameters from a peer storage device among the plurality of storage devices; and
- means for accessing, using the peer set of access parameters of the peer storage device, a peer host resource allocated to the peer storage device.

* * * * *